(12) United States Patent
Yang et al.

(10) Patent No.: US 10,386,710 B2
(45) Date of Patent: Aug. 20, 2019

(54) PROJECTOR AND ILLUMINATION SYSTEM THEREOF

(71) Applicant: Coretronic Corporation, Hsin-Chu (TW)

(72) Inventors: De-Sheng Yang, Hsin-Chu (TW);
Ming-Tsung Weng, Hsin-Chu (TW);
Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/939,240

(22) Filed: Mar. 28, 2018

(65) Prior Publication Data

US 2018/0284586 A1     Oct. 4, 2018

(30) Foreign Application Priority Data

Mar. 31, 2017   (CN) .......................... 2017 1 0206284

(51) Int. Cl.
*G03B 21/28*      (2006.01)
*G02B 9/12*       (2006.01)
(Continued)

(52) U.S. Cl.
CPC ............... *G03B 21/28* (2013.01); *G02B 9/12* (2013.01); *G02B 19/0014* (2013.01); *G02B 26/008* (2013.01); *G02B 27/0955* (2013.01); *G03B 21/204* (2013.01); *G03B 33/06* (2013.01); *G02B 5/021* (2013.01); *G02B 27/141* (2013.01); *G02B 27/48* (2013.01)

(58) Field of Classification Search
CPC ...... G03B 21/28; G02B 9/12; G02B 19/0014; G02B 26/008; G02B 27/0955; G02B 5/021; G02B 27/141; G02B 27/48

USPC ......................................................... 353/98
See application file for complete search history.

(56) References Cited

U.S. PATENT DOCUMENTS 5,580,142  A   12/1996  Kurematsu et al.
8,469,520 B2    6/2013  Maeda
(Continued)

FOREIGN PATENT DOCUMENTS

CN      101937127 A    1/2011
CN      101937161 A    1/2011
(Continued)

OTHER PUBLICATIONS

Machine Translation of 2014075221 A (Year: 2019).*

*Primary Examiner* — Steven Whitesell Gordon
*Assistant Examiner* — Jerry L Brooks

(57) ABSTRACT

A projector and an illumination system thereof are provided. The illumination system includes an excitation light source group, a phosphor wheel, a light combiner element and a first lens group. The excitation light source group provides a first beam and has a first optical axis. The phosphor wheel has a reflection region and a wavelength conversion region. The light combiner element is disposed between the excitation light source group and the phosphor wheel and has a dichroic portion and a reflection portion. The first lens group is disposed between the light combiner element and the phosphor wheel. The first lens group has a second optical axis. The illumination system is provided in the projector to reduce the number of optical elements, thereby reducing the cost and volume.

16 Claims, 11 Drawing Sheets

(51) Int. Cl.
  *G02B 27/09*  (2006.01)
  *G02B 26/00*  (2006.01)
  *G02B 19/00*  (2006.01)
  *G03B 21/20*  (2006.01)
  *G03B 33/06*  (2006.01)
  *G02B 27/14*  (2006.01)
  *G02B 5/02*   (2006.01)
  *G02B 27/48*  (2006.01)

(56) References Cited

U.S. PATENT DOCUMENTS

| | | |
|---|---|---|
| 8,911,092 B2 | 12/2014 | Fujita et al. |
| 9,151,471 B2 | 10/2015 | Ogura |
| 9,229,301 B2 | 1/2016 | Huang |
| 9,348,204 B2 | 5/2016 | Chiu et al. |
| 9,411,218 B2 | 8/2016 | Hsieh et al. |
| 9,645,480 B2 | 5/2017 | Liao et al. |
| 9,897,907 B2 | 2/2018 | Hsieh et al. |
| 2005/0057145 A1 | 3/2005 | Shieh et al. |
| 2010/0245776 A1 | 9/2010 | Yamatoto |
| 2010/0328554 A1 | 12/2010 | Shibasaki |
| 2010/0328626 A1 | 12/2010 | Miyazaki |
| 2010/0328632 A1 | 12/2010 | Kurosaki et al. |
| 2011/0043764 A1 | 2/2011 | Narikawa |
| 2011/0205502 A1 | 8/2011 | Kato et al. |
| 2011/0310353 A1 | 12/2011 | Maeda |
| 2012/0062857 A1 | 3/2012 | Saitou et al. |
| 2012/0075591 A1 | 3/2012 | Ogura et al. |
| 2012/0242912 A1* | 9/2012 | Kitano .............. H04N 9/3111 348/759 |
| 2013/0021582 A1 | 1/2013 | Fujita et al. |
| 2013/0083509 A1 | 4/2013 | Ko |
| 2013/0100417 A1 | 4/2013 | Yang et al. |
| 2013/0100420 A1 | 4/2013 | Ferri et al. |
| 2013/0250253 A1 | 9/2013 | Ogura |
| 2013/0314671 A1 | 11/2013 | Tseng |
| 2013/0322056 A1 | 12/2013 | Konuma et al. |
| 2014/0071407 A1 | 3/2014 | Takahashi et al. |
| 2014/0211169 A1 | 7/2014 | Kitano et al. |
| 2014/0285774 A1 | 9/2014 | Tajiri |
| 2015/0023012 A1 | 1/2015 | Yang et al. |
| 2015/0153636 A1* | 6/2015 | Hartwig .............. G03B 21/204 353/31 |
| 2015/0167907 A1 | 6/2015 | Hoehmann |
| 2015/0177599 A1 | 6/2015 | Huang |
| 2015/0253653 A1 | 9/2015 | Fujita et al. |
| 2015/0316775 A1 | 11/2015 | Hsieh et al. |
| 2015/0362830 A1 | 12/2015 | Liao et al. |
| 2017/0192347 A1 | 7/2017 | Huang et al. |

FOREIGN PATENT DOCUMENTS

| | | | |
|---|---|---|---|
| CN | 101937165 A | 1/2011 | |
| CN | 101995750 A | 3/2011 | |
| CN | 102155639 A | 8/2011 | |
| CN | 102213383 A | 10/2011 | |
| CN | 102393598 A | 3/2012 | |
| CN | 102520569 A | 6/2012 | |
| CN | 102650809 A | 8/2012 | |
| CN | 102722073 A | 10/2012 | |
| CN | 102722075 A | 10/2012 | |
| CN | 102854729 A | 1/2013 | |
| CN | 102890398 A | 1/2013 | |
| CN | 103052841 A | 4/2013 | |
| CN | 103062672 A | 4/2013 | |
| CN | 103207507 A | 7/2013 | |
| CN | 103324015 A | 9/2013 | |
| CN | 203217230 U | 9/2013 | |
| CN | 103453448 A | 12/2013 | |
| CN | 103676428 A | 3/2014 | |
| CN | 204593250 U | 8/2015 | |
| CN | 105022214 A | 11/2015 | |
| CN | 105278226 A | 1/2016 | |
| CN | 104238248 B | 7/2016 | |
| CN | 206610072 U | 11/2017 | |
| EP | 2360523 A1 | 8/2011 | |
| JP | 2004341105 A | 12/2004 | |
| JP | 2011128521 A | 6/2011 | |
| JP | 2011209555 A | 10/2011 | |
| JP | 2014075221 A * | 4/2014 | .............. F21S 2/00 |
| KR | 20130024564 | 3/2013 | |
| TW | 580545 | 3/2004 | |
| TW | 200408784 | 6/2004 | |
| TW | M423266 U1 | 2/2012 | |
| TW | M436167 U1 | 8/2012 | |
| TW | 201307756 A1 | 2/2013 | |
| TW | 201319718 A1 | 5/2013 | |
| TW | 201335691 A1 | 9/2013 | |
| TW | 201405048 A | 2/2014 | |
| TW | M482090 U | 7/2014 | |
| TW | 201512762 A | 4/2015 | |
| TW | 201546495 A | 12/2015 | |
| WO | 2013056594 A1 | 4/2013 | |
| WO | 2014006206 A1 | 1/2014 | |
| WO | 2014046219 A1 | 3/2014 | |

* cited by examiner

PROJECTOR AND ILLUMINATION SYSTEM THEREOF

CROSS-REFERENCE TO RELATED APPLICATION

THIS APPLICATION CLAIMS THE PRIORITY BENEFIT OF CHINA APPLICATION (CN201710206284.3 FILED ON 2017 Mar. 31). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to an illumination system, and more particularly to an illumination system for a projector.

BACKGROUND OF THE INVENTION

A digital light processing (DLP) projection device includes an illumination system, a digital micro-mirror device (DMD) and a projection lens. The illumination system is used to provide an illumination beam, the digital micro-mirror device is used to convert the illumination beam into an image beam, and the projection lens is used to project the image beam onto a screen to form an image screen on the screen. In general, an early illumination system uses an ultra-high pressure mercury lamp as a light source, and the ultra-high pressure mercury lamp can provide white light as an illumination beam. With the development of illumination technology, other light sources such as light-emitting diode light source and laser light source having an energy-saving advantage are gradually being used.

FIG. 1 is a schematic view of a conventional illumination system using a laser light source. As shown in FIG. 1, in the conventional illumination system 100, a blue beam 112 provided by a laser light source module 110 sequentially passes through a collimating element 122, penetrates a dichroic mirror 130, passes through lenses 123, 124, and is irradiated to a rotatable phosphor wheel 140. The phosphor wheel 140 may be divided into a green phosphor region, a yellow phosphor region, an opening region, etc., wherein a back surface 141 of the green phosphor region and the yellow phosphor region of the phosphor wheel 140 are correspondingly disposed with a reflection element (not shown). The blue beam 112 is sequentially irradiated to the green phosphor region, the yellow phosphor region and the opening region. A green beam 113 and a yellow beam 114 are excited when the blue beam 112 is irradiated to the green phosphor region and the yellow phosphor region respectively, and the reflection element reflects the green beam 113 and the yellow beam 114 back to the dichroic mirror 130. Then, the green beam 113 and the yellow beam 114 are reflected by the dichroic mirror 130, pass through a lens 125 and are irradiated to a rotatable phosphor wheel 150. In addition, a portion of the blue beam 112 sequentially penetrates the opening region, passes through lens 126, 127, reflection elements 161, 162, a lens 128, a reflection element 163, a lens 129, the dichroic mirror 130, the lens 125 and is irradiated to the color wheel 150.

The color wheel 150 has a red light filter region and a transparent region corresponding to the yellow phosphor region, a green light filter region corresponding to the green phosphor region and a diffusion region corresponding to the opening region. By the control of the color wheel 150 and the phosphor wheel 140 to rotate with each other, the green beam 113 is irradiated to the green light filter region, the yellow beam 114 is irradiated to the red light filter region and the transparent region, and the blue beam 112 is irradiated to the diffusion region. Thus, the beam entering a light integration rod 170 after passing through the color wheel 150 includes a blue beam, a green beam and a red beam for forming a color image and a yellow beam for increasing the luminance.

Since having a complicated structure and requiring many optical elements, the conventional illumination system 100 has some disadvantages such as high cost, large volume and poor optical efficiency.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide an illumination system for reducing the number of optical elements and thereby reducing the cost and volume.

Another objective of the invention is to provide a projector having the advantage of lower cost and smaller size.

Other objectives and advantages of the invention will become apparent from the technical features disclosed in the invention.

In order to achieve one or some or all of the above objectives or other objectives, the invention provides an illumination system, which includes an excitation light source group, a phosphor wheel, a light combiner element and a first lens group. The excitation light source group is adapted to provide a first beam. The excitation light source group has a first optical axis. The phosphor wheel has a reflection region and a wavelength conversion region. The light combiner element is disposed between the excitation light source group and the phosphor wheel. The light combiner element has a dichroic portion and a reflection portion. The first lens group is disposed between the light combiner element and the phosphor wheel. The first lens group has a second optical axis. The first beam passes through the dichroic portion and the first lens group and is transmitted to the reflection region of the phosphor wheel. The first beam passes through the first lens group via a first side of the second optical axis. The reflection region of the phosphor wheel reflects the first beam. The reflected first beam passes through the first lens group and is transmitted to the light combiner element. The first beam reflected from the reflection region passes through the first lens group via a second side of the second optical axis and is transmitted to the reflection portion of the light combiner element. The first optical axis of the excitation light source group and the second optical axis of the first lens group are not coaxial with each other.

The invention further provides projector, which includes an illumination system, a light valve and a lens. The illumination system includes an excitation light source group, a phosphor wheel, a light combiner element, a first lens group and a light collection component. The excitation light source group is adapted to provide a first beam. The excitation light source group has a first optical axis. The phosphor wheel has a reflection region and a wavelength conversion region. The light combiner element is disposed between the excitation light source group and the phosphor wheel. The light combiner element has a dichroic portion and a reflection portion. The first lens group is disposed between the light combiner element and the phosphor wheel. The first lens group has a second optical axis. The first beam passes through the dichroic portion and the first lens group and is transmitted to the reflection region of the phosphor wheel. The first beam passes through the first lens group via a first side of the second optical axis. The reflection region of the phosphor wheel reflects the first beam. The reflected first beam passes through the first lens group and is transmitted to the light combiner element. The first beam reflected from the reflection region passes through the first lens group via a second side of the second optical axis and is transmitted to the reflection portion of the light combiner element. The first optical axis of the excitation light source group and the second optical axis of the first lens group are not coaxial with each other. The light collection component is located on transmission paths of the first beam and a second beam and adapted to receive the first beam passing through the first lens group and the second beam to form an illumination beam. The light valve is located on a transmission path of the illumination beam and adapted to convert the illumination beam into an image beam. The projection lens is located on a transmission path of the image beam and adapted to convert the image beam into a projection beam.

In summary, according to the illumination system of the embodiment of the invention, since a light combiner element having a dichroic portion and a reflection portion is disposed between an excitation light source group and a phosphor wheel, the optical path is effectively shortened, the number of optical components of the illumination system is drastically reduced, thereby reducing the cost and volume. In addition, the projector of the embodiment of the invention has some advantages such as having lower cost and smaller size due to employing the illumination system.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
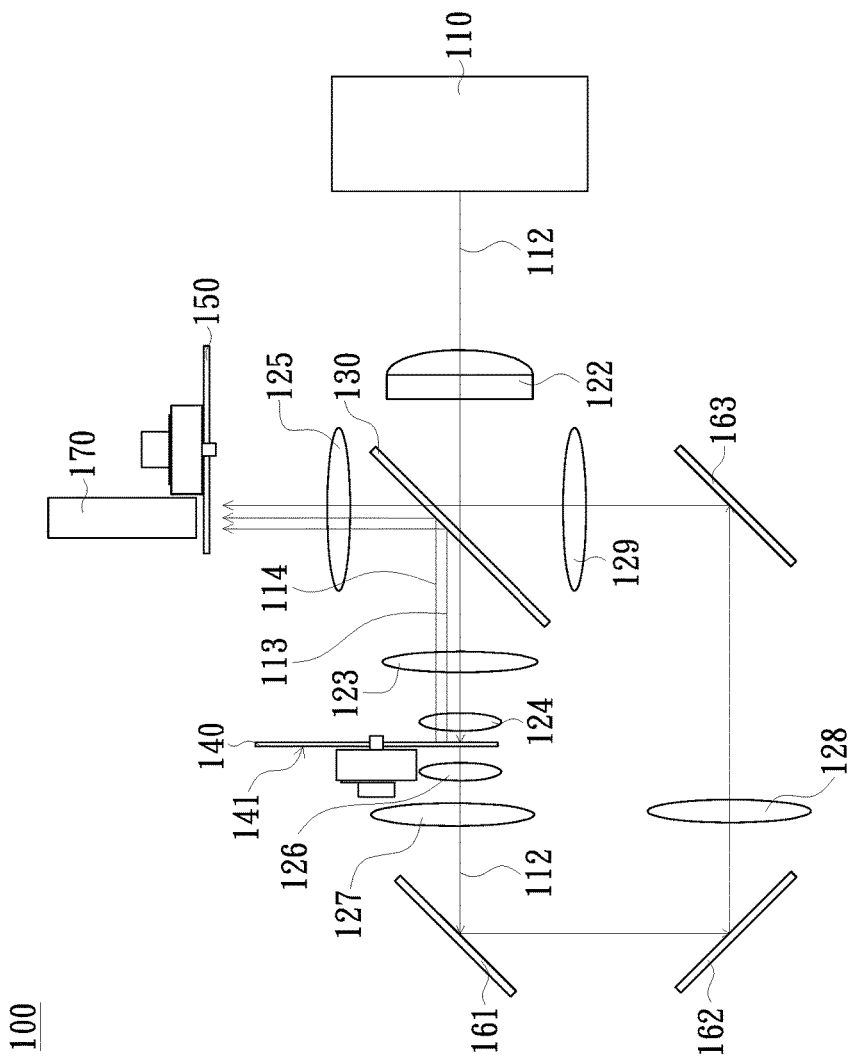
FIG. 1 is a schematic view of a conventional illumination system using a laser light source.
Figure 2:
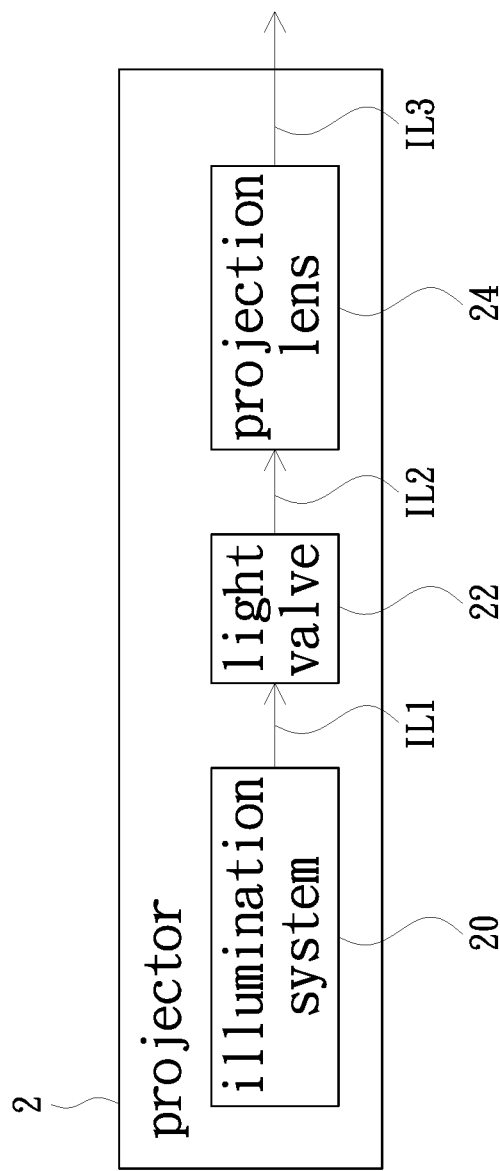
FIG. 2 is a functional block diagram of a projector in accordance with an embodiment of the invention.

FIG. 2 is a functional block diagram of a projector in accordance with an embodiment of the invention. As shown in FIG. 2, the projector 2 of the embodiment includes an illumination system 20, a light valve 22 and a projection lens 24. The illumination system 20 is adapted to provide an illumination beam IL1. The light valve 22 is located on the transmission path of the illumination beam IL1, and the light valve 22 is adapted to convert the illumination beam IL1 into an image beam IL2. In the embodiment, the light valve 22 may be a digital micro-mirror device (DMD), a liquid crystal on silicon (LCoS) or a liquid crystal display (LCD), but the invention is not limited thereto. The projection lens 24 is located on the transmission path of the image beam IL2, and the projection lens 24 is adapted to convert the image beam IL2 into a projection beam IL3 and project the projection beam IL3 out from the projector.

The detailed structure of the illumination system 20 of the embodiment will be further described below.

Figure 3:
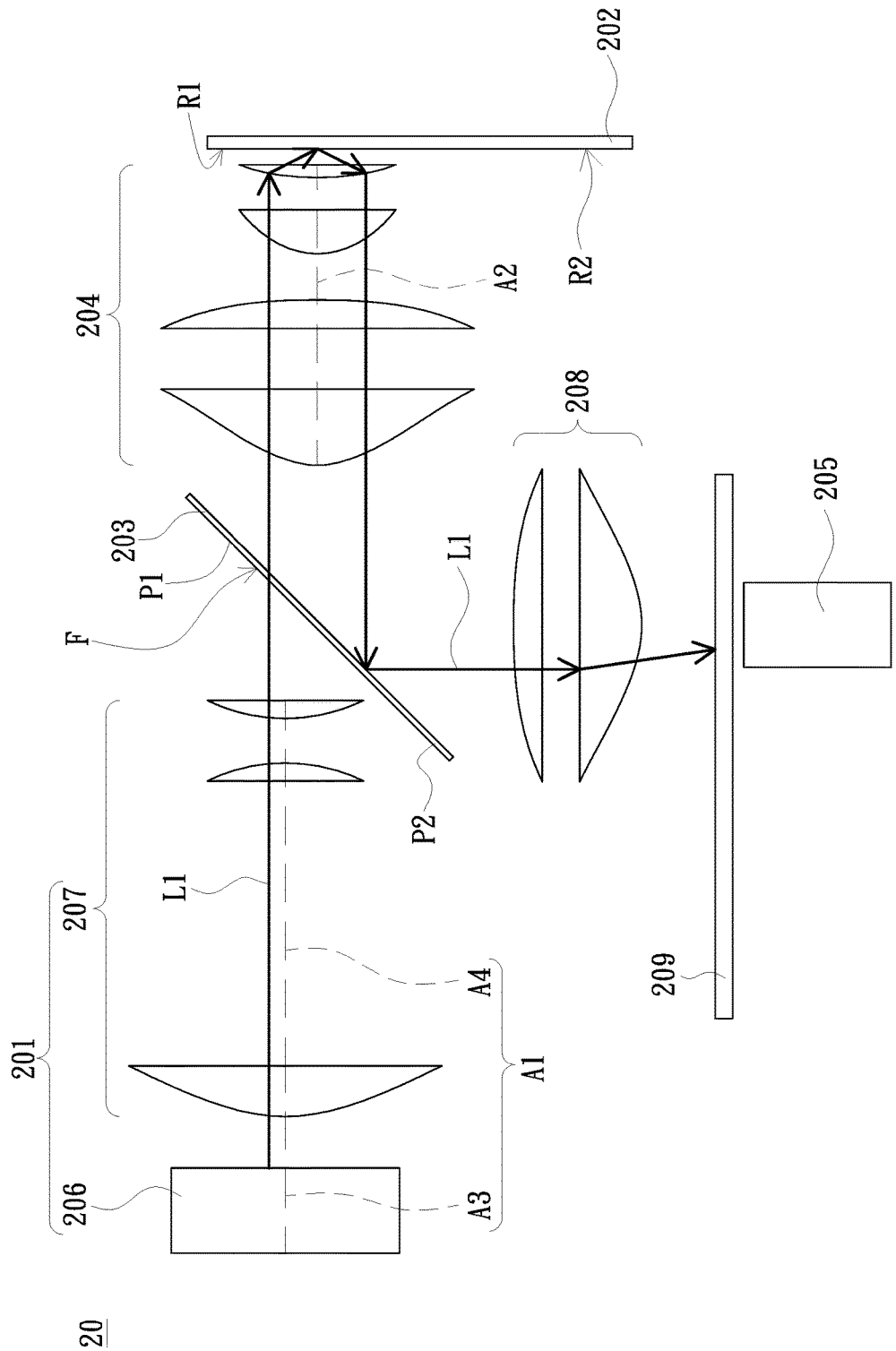
FIG. 3 is a schematic view of an illumination system shown in FIG. 2.
Figure 4:
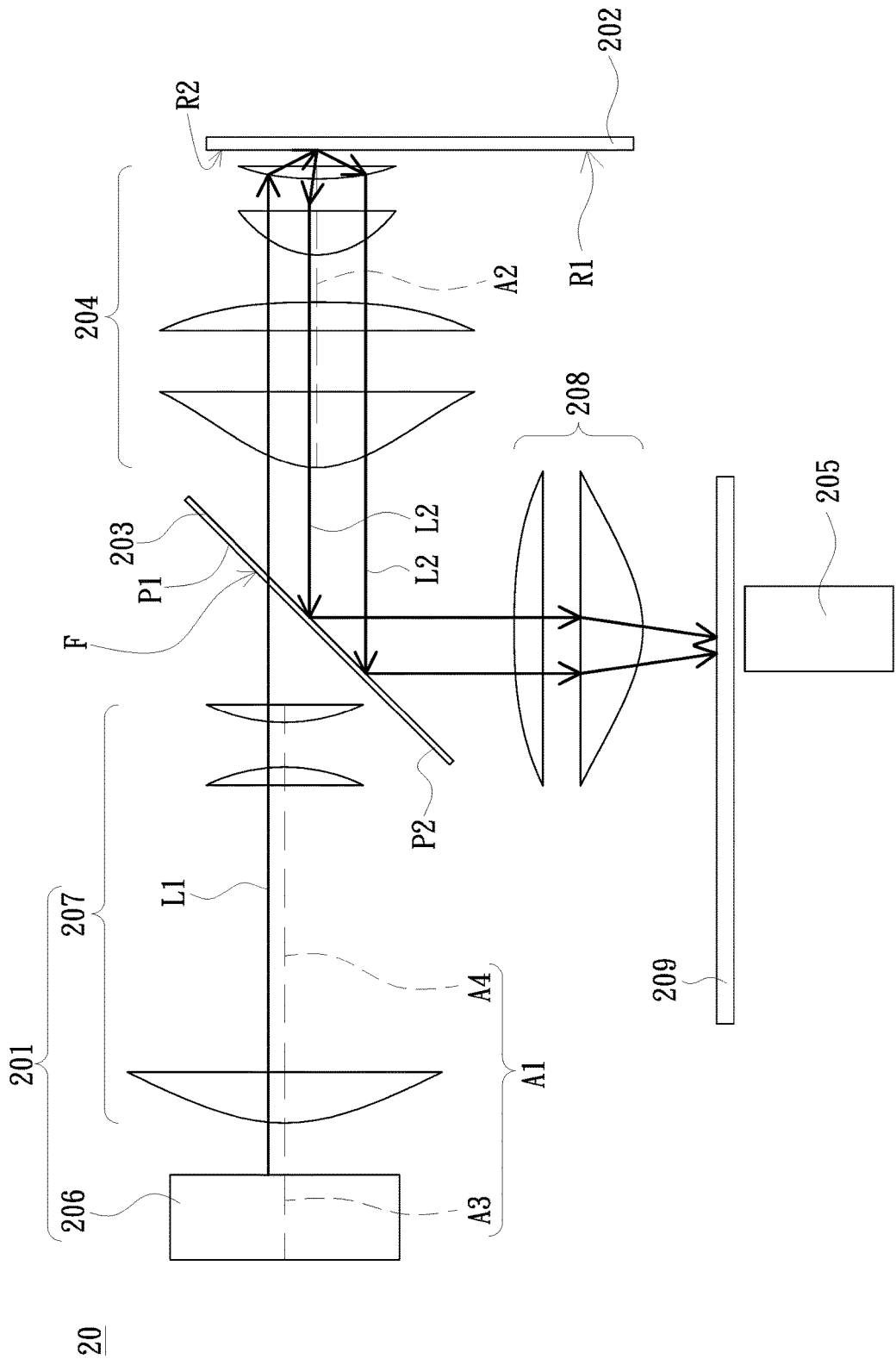
FIG. 4 is a schematic view of an optical path in which a first beam is converted into a second beam shown in FIG. 3.

Referring to FIGS. 3 and 4. FIG. 3 is a schematic view of an illumination system shown in FIG. 2, and FIG. 4 is a schematic view of an optical path in which a first beam is converted into a second beam shown in FIG. 3.

As shown in FIG. 3, the illumination system 20 of the embodiment includes an excitation light source group 201, a phosphor wheel 202, a light combiner element 203, a first lens group 204 and a light collection element 205. The excitation light source group 201 is adapted to provide a first beam L1, and the excitation light source group 201 has a first optical axis A1. The phosphor wheel 202 has a reflection region R1 and a wavelength conversion region R2. The reflection region R1 is adapted to reflect the first beam L1. The wavelength conversion region R2 is adapted to convert the first beam L1 into a second beam L2 with a different color. In the embodiment, the reflection region R1 is a metal substrate having a high reflectivity or a high-reflection mirror for example, the wavelength conversion region R2 is a high-reflection substrate disposed with a yellow phosphor coating layer or a green phosphor coating layer for example, but the invention is not limited thereto. The light combiner element 203 is disposed between the excitation light source group 201 and the phosphor wheel 202, and the light combiner element 203 has a dichroic portion P1 and a reflection portion P2. The first lens group 204 is disposed between the light combiner element 203 and the phosphor wheel 202, and the first lens group 204 has a second optical axis A2. In the embodiment, the second optical axis A2 of the first lens group 204 and the first optical axis A1 of the excitation light source group 201 are not coaxial with each other. The light collection element 205 is adapted to receive the first beam L1 and the second beam L2 to form the illumination beam IL1. In the embodiment, the light collection element 205 is a light integration rod for example, but the invention is not limited thereto.

The excitation light source group 201 of the embodiment includes a light emitting element 206 and a second lens group 207. The second lens group 207 is disposed between the light combiner element 203 and the light emitting element 206. The light emitting element 206 is, for example, a laser diode or arranged as a laser light emitting array and is used to provide the first beam L1. In the embodiment, the light emitting element 206 has a third optical axis A3 and the second lens group 207 has a fourth optical axis A4. That is, the first optical axis A1 of the excitation light source group 201 includes the third optical axis A3 and the fourth optical axis A4. Specifically, the third optical axis A3 of the light emitting element 206 and the fourth optical axis A4 of the second lens group 207 are coaxial with each other. In another embodiment, the third optical axis A3 of the light emitting element 206 and the second optical axis A2 of the first lens group 204 are not coaxial with each other, the third optical axis A3 and the second optical axis A2 are parallel to each other, the fourth optical axis A4 of the second lens group 207 and the second optical axis A2 of the first lens group 204 are not coaxial with each other, and the fourth optical axis A4 and the second optical axis A2 are parallel to each other. It is to be noted that the invention does not limit the type of the light emitting element 206; and in other embodiments, the light emitting element 206 may be a light emitting diode element or other suitable type of light emitting element. In addition, the second lens group 207 may be omitted or replaced with other suitable optical elements depending on the design requirements.

The illumination system 20 of the embodiment further includes a third lens group 208 and a color wheel 209. The third lens group 208 and the color wheel 209 are located on the transmission paths of the first beam L1 and the second beam L2. The third lens group 208 is located between the light combiner element 203 and the color wheel 209, and the color wheel 209 is located between the third lens 208 and the light collection element 205. The color wheel 209 has a diffusion region (not shown) corresponding to the reflection region R1 of the phosphor wheel 202 and a filter region (not shown) (e.g., a red light filter region or a green light filter region, not shown) corresponding to the wavelength conversion region R2 of the phosphor wheel 202. The third lens group 208 may be omitted or replaced with other suitable optical elements depending on the design requirements.

Referring to FIGS. 3 and 4. FIG. 4 is a schematic view of an optical path in which the first beam L1 is converted into the second beam L2 shown in FIG. 3. In the embodiment, the first beam L1 provided by the light emitting element 206 is a blue beam or an ultraviolet beam for example, and the second beam L2 is a yellow beam or a green beam for example, but the invention is not limited thereto. As shown in FIG. 3, the first beam L1 passes through the second lens group 207, the dichroic portion P1 of the light combiner element 203 and the first lens group 204 sequentially and is transmitted to the reflection region R1 of the phosphor wheel 202. Specifically, the first beam L1 passes through the first lens group 204 via a first side of the second optical axis A2 of the first lens group 204, that is, the first beam L1 passes above the second optical axis A2 of the first lens group 204, but the invention is not limited thereto. The reflection region R1 reflects the first beam L1. The reflected first beam L1 passes through the first lens group 204 and is transmitted to the reflection portion P2 of the light combiner element 203. Specifically, the first beam L1 reflected from the reflection region R1 passes through the first lens group 204 via a second side of the second optical axis A2 of the first lens group 204, that is, the first beam L1 reflected from the reflection region R1 passes under the second optical axis A2 of the first lens group 204. In the above embodiment, spatially, the second side of the second optical axis A2 is located between the first side of the second optical axis A2 and the third lens group 208. The reflection portion P2 of the light combiner element 203 reflects the first beam L1. The reflected first beam L1 passes through the third lens group 208 and the color wheel 209 and is transmitted to the light collection element 205. As shown in FIG. 4, when the phosphor wheel 202 rotates to cause the first beam L1 to be irradiated to the wavelength conversion region R2, the wavelength conversion region R2 of the phosphor wheel 202 converts a portion of the first beam L1 into the second beam L2, wherein the wavelength and color of the second beam L2 are different from those of the first beam L1. The wavelength conversion region R2 of the phosphor wheel 202 reflects the second beam L2, which passes through the first lens group 204 and is transmitted to the dichroic portion P1 and the reflection portion P2 of the light combiner element 203. The dichroic portion P1 and the reflection portion P2 of the light combiner element 203 reflect the second beam L2. The reflected second beam L2 passes through the third lens group 208 and the color wheel 209 and is transmitted to the light collection element 206. The dichroic portion P1 of the light combiner element 203 allows the first beam L1 to pass therethrough and reflects the second beam L2, and the light collection element 205 may be an integration rod.

Referring to FIGS. 3 and 4. In the transmission path of the first beam L1, there is no a reflecting mirror (substantially total reflection) disposed between the phosphor wheel 202 and the light combiner element 203.

Figure 5:
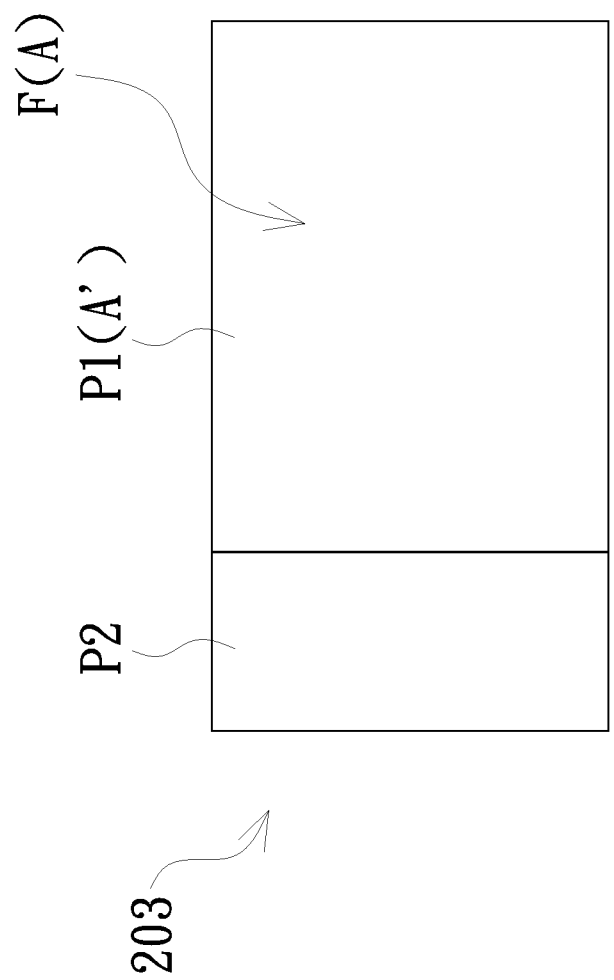
FIG. 5 is a schematic top view of a light combiner element shown in FIG. 3.

FIG. 5 is a schematic top view of the light combiner element 203 shown in FIG. 3. As shown FIGS. 3 to 5, the light emitting element 203 of the embodiment has a surface F facing the excitation light source group 201, and the surface F is adapted to receive the first beam L1 from the excitation light source group 201. In the embodiment, the area of the surface F of the light combiner element 203 is A, the area of the dichroic portion P1 of the light combiner element 203 is A', and the area A of the surface F and the area A' of the dichroic portion P1 satisfy the equation: A'≤¾A. In the optical path shown in FIG. 3, since the first optical axis A1 of the excitation light source group 201 and the second optical axis A2 of the first lens group 204 are not coaxial with each other in the embodiment, the first beam L1 provided by the excitation light source group 201 can pass through the first lens group 204 via the first side of the second optical axis A2 of the first lens group 204 and pass through the first lens group 204 via the second side of the second optical axis A2 of the first lens group 204 after being reflected by the reflection region R1 of the phosphor wheel 202. In addition, under the condition in which the area A of the surface F and the area A' of the dichroic portion P1 of the light combiner element 203 satisfy the equation of A'≤¾A, the amount of light of the first beam L1 of the excitation light source group 201 passing through the reflection portion P2 of the light combiner element 203 is increased, thereby ensuring that the first beam L1 can be completely reflected by the reflection portion P2 of the light combiner element 203 before being transmitted to the phosphor wheel 202. Thus, the light uniformity of the blue beam transmitted to the light collection element 205 is improved. In the other embodiment of the invention, the phosphor wheel 202 and the color wheel 209 are in the same side of the light combiner element 203. The side of the light combiner element 203 is opposite to a side of the light combiner element 203 having the surface F.

Figure 6:
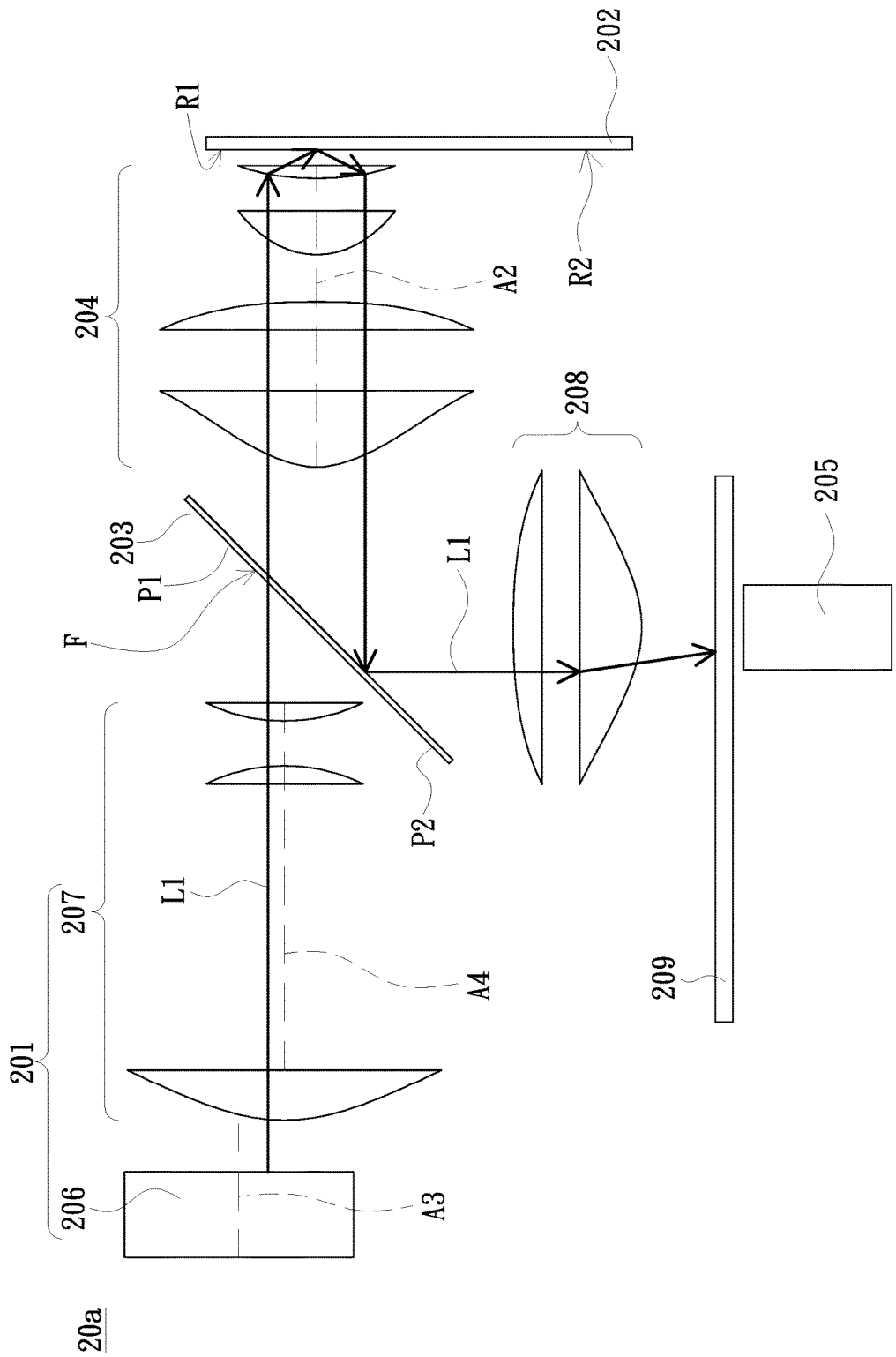
FIG. 6 is a schematic view of an illumination system in accordance with another embodiment of the invention.

FIG. 6 is a schematic view of an illumination system in accordance with another embodiment of the invention. As shown in FIG. 6, the illumination system 20a of the embodiment is similar to the illumination system 20 shown in FIG. 3, except that in the embodiment the third optical axis A3 of the light emitting element 206 and the fourth optical axis A4 of the second lens group 207 are not coaxial with each other and the third optical axis A3 of the light emitting element 206 and the fourth optical axis A4 of the second lens group 207 are parallel to each other. That is, in the embodiment, the second optical axis A2 of the first lens group 204, the third optical axis A3 of the light emitting element 206 and the fourth optical axis A4 of the second lens group 207 are not coaxial with each other. Thus, the light utilization efficiency can be effectively improved under this structural design.

Figure 7:
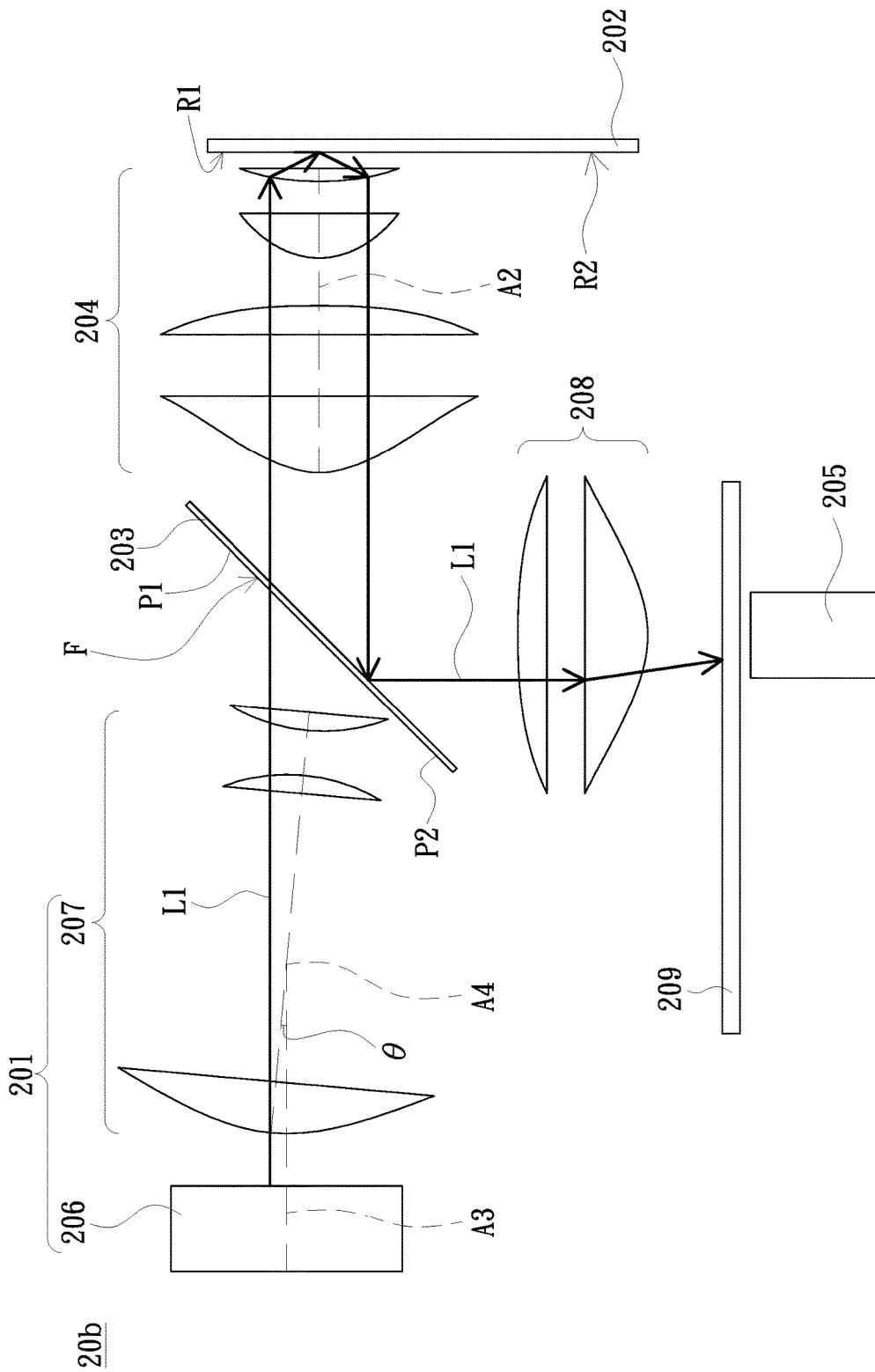
FIG. 7 is a schematic view of an illumination system in accordance with another embodiment of the invention.

FIG. 7 is a schematic view of an illumination system in accordance with another embodiment of the invention. As shown in FIG. 7, the illumination system 20b of the embodiment is similar to the illumination system 20 shown in FIG. 3, except that in the embodiment the third optical axis A3 of the light emitting element 206 and the fourth optical axis A4 of the second lens group 207 are not coaxial with each other and the third optical axis A3 of the light emitting element 206 and the fourth optical axis A4 of the second lens group 207 are not parallel to each other. That is, in the embodiment, the second optical axis A2 of the first lens group 204, the third optical axis A3 of the light emitting element 206 and the fourth optical axis A4 of the second lens group 207 are not coaxial with each other and there is an angle θ between the third optical axis A3 of the light emitting element 206 and the fourth optical axis A4 of the second lens group 207; wherein the angle θ is, for example, substantially equal to 5 degrees, but the invention is not limited thereto. Thus, the light utilization efficiency can be effectively improved under this structural design.

Figure 8:
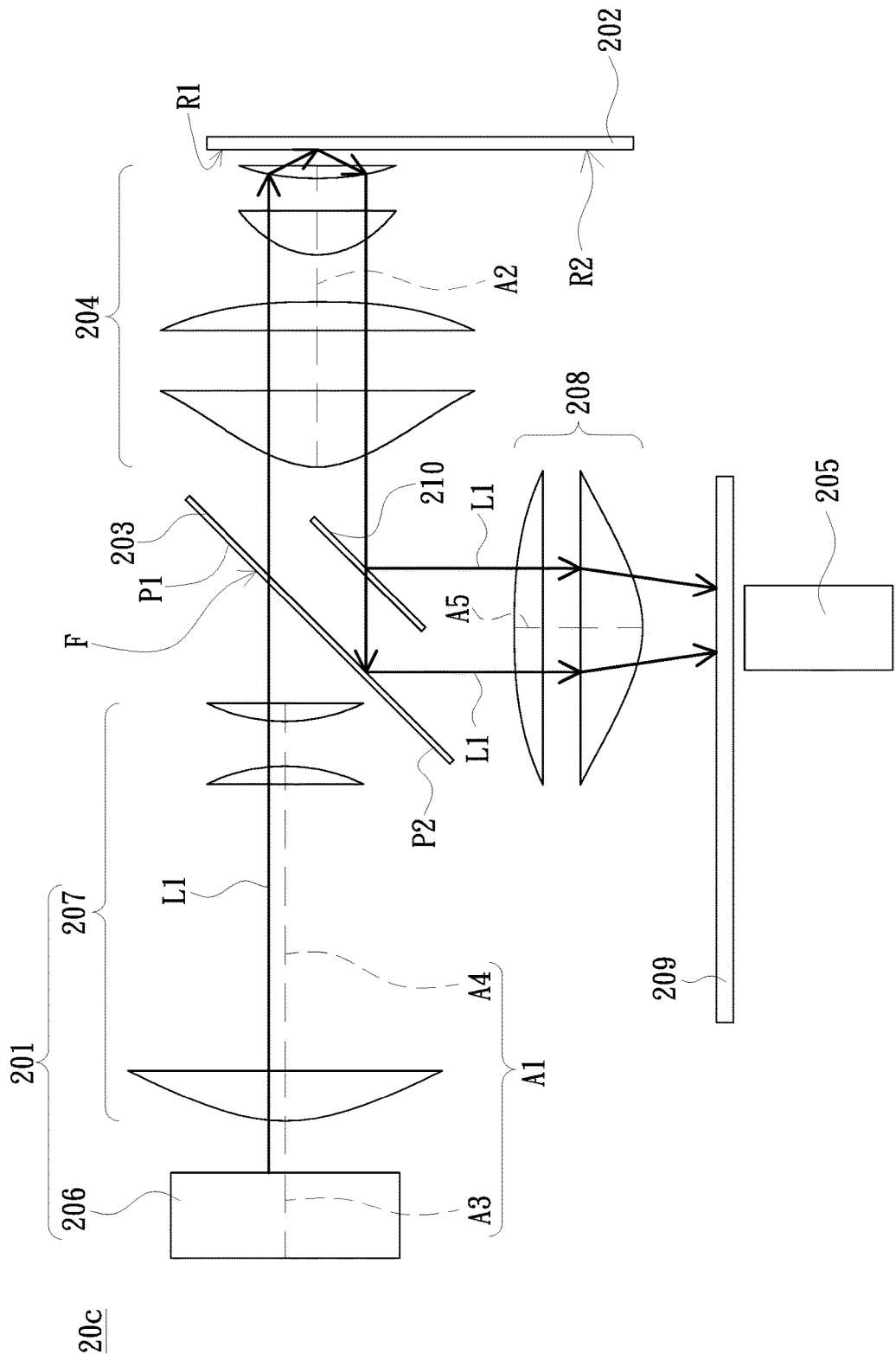
FIG. 8 is a schematic view of an illumination system in accordance with another embodiment of the invention.

FIG. 8 is a schematic view of an illumination system in accordance with another embodiment of the invention. As shown in FIG. 8, the illumination system 20c of the embodiment is similar to the illumination system 20 shown in FIG. 3, except that the illumination system 20c of the embodiment further includes a beam splitting element 210. The beam splitting element 210 of the embodiment is located on the transmission paths of the first beam L1 and the second beam L2, and the beam splitting element 210 is located between the light combiner element 203 and the third lens group 208. In the embodiment, the beam splitting element 210 is, for example, a coated glass having a half-penetration-and-half-reflection function for both of the first beam L1 and the second beam L2, but the invention is not limited thereto. The reflection region R1 reflects the first beam L1 when the phosphor wheel 202 rotates to cause the first beam L1 to be irradiated to the reflection region R1. The reflected first beam L1 passes through the first lens group 204 and the beam splitting element 210 and is transmitted to the reflection portion P2 of the light combiner element 203. A portion of the first beam L1 penetrates the beam splitting element 210 and is transmitted to the light combiner element 203, and the remainder of the first beam L1 is reflected by the beam splitting element 210 and transmitted to the third lens group 208. Specifically, the third lens group 208 of the embodiment has a fifth optical axis A5. The portion of the first beam L1 penetrating the beam splitting element 210 is reflected by the reflection portion P2 of the light combiner element 203, passes through the third lens group 208 via one side of the fifth optical axis A5 of the third lens group 208, and is transmitted to the color wheel 209 and the light collection element 205. The remainder of the first beam L1 reflected by the beam splitting element 210 passes through the third lens group 208 via the other side of the fifth optical axis A5 of the third lens group 208 and is transmitted to the color wheel 209 and the light collection element 205. The wavelength conversion region R2 of the phosphor wheel 202 converts a portion of the first beam L1 into the second beam L2 when the phosphor wheel 202 rotates to cause the first beam L1 to be irradiated to the wavelength conversion region R2. The second beam L2 reflected by the wavelength conversion region R2 of the phosphor wheel 202 directly penetrates the beam splitting element 210 and is transmitted to the dichroic portion P1 and the reflection portion P2 of the light combiner element 203.

In the embodiment, the beam splitting element 210 allows 50% of the first beam L1 to penetrate and reflects 50% of the first beam L1 for example, and meanwhile, the beam splitting element 210 allows 50% of the second beam L2 to penetrate and reflects 50% of the second beam L2 for example, but the invention is not limited thereto. The effect of disposing the beam splitting element 210 between the light combiner element 203 and the third lens group 208 is to adjust the angle at which the first beam L1 is incident on the light collection element 205, so as to cause that the angle at which the first beam L1 is incident on the light collection element 205 can be substantially same as the angle at which the second beam L2 is incident on the light collection element 205. Therefore, the illumination beam has a good uniformity, thereby improving the image quality of the projector.

Figure 9:
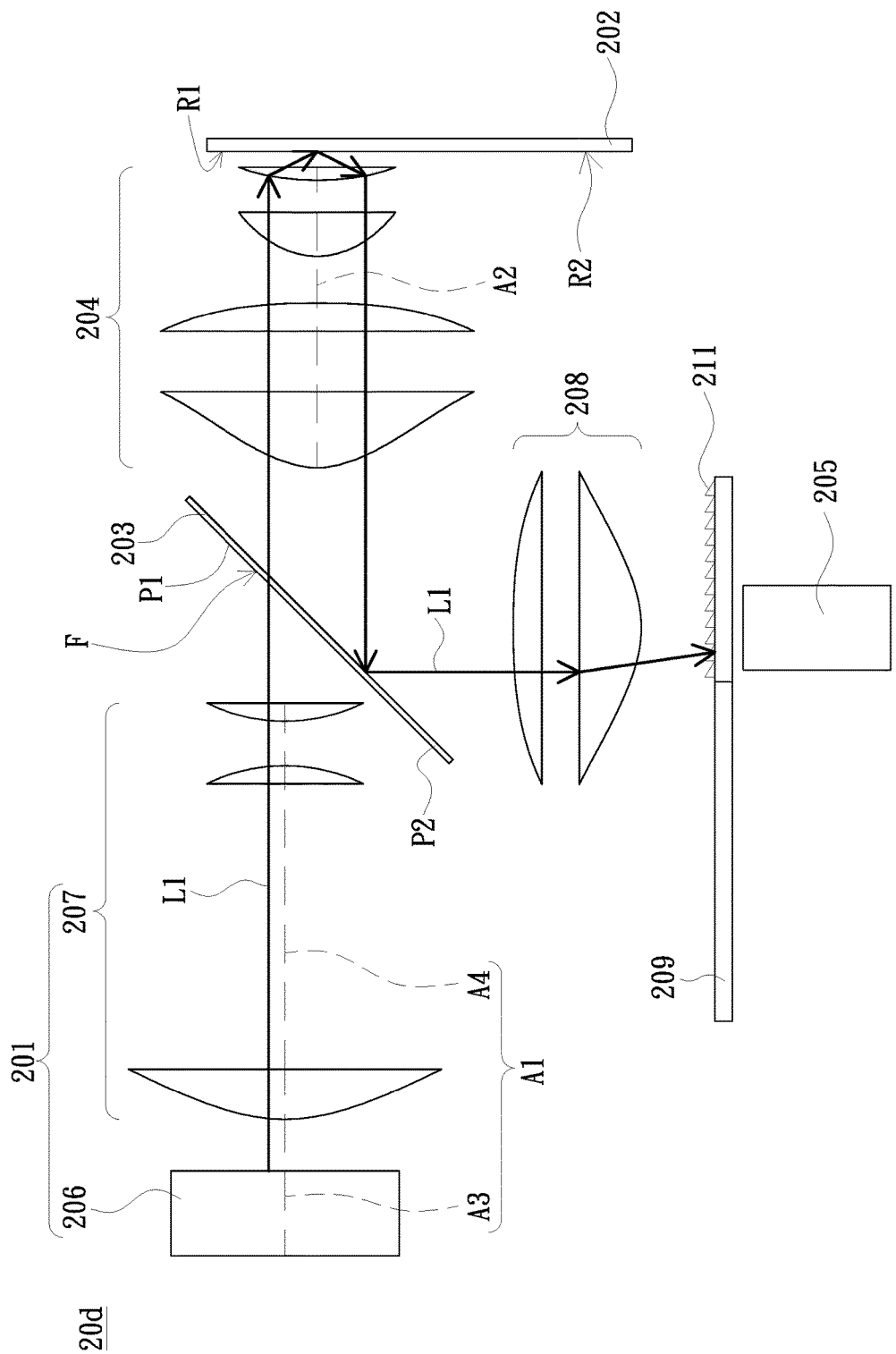
FIG. 9 is a schematic view of an illumination system in accordance with another embodiment of the invention.

FIG. 9 is a schematic view of an illumination system in accordance with another embodiment of the invention. As shown in FIG. 9, the illumination system 20*d* of the embodiment is similar to the illumination system 20 shown in FIG. 3, except that the illumination system 20*d* of the embodiment further includes a scattering structure 211. The scattering structure 211 of the embodiment is disposed on the color wheel 209. Specifically, the scattering structure 211 is disposed on the transmission path of the first beam L1. In other words, the scattering structure 211 is disposed on the diffusion region of the color wheel 209 where the first beam L1 is irradiated and corresponding to the reflection region R1 of the phosphor wheel 202. The effect of disposing the scattering structure 211 on the color wheel 209 is that when the first beam L1 passes through the region of the color wheel 209 having the scattering structure 211, the scattering structure 211 can effectively suppress the degree of speckle of the first beam L1 and reduce the speckle noise of the illumination system 20*d*, thereby increasing the image quality of the projector. In addition, the scattering structure 211 may also help the first beam L1 to be transmitted to the light collection element 205. In the embodiment, the scattering structure 211 is, for example, a light-transmitting diffuser, a light-transmitting substance having a scattering material therein or a plurality of prism microstructures, but the invention is not limited thereto. It is to be noted that disposing the scattering structure 211 on the color wheel 209 is only one of the embodiments of the invention, and the invention is not limited thereto. In one embodiment, the scattering structure 211 is, for example, disposed on the dichroic portion P1 (not shown) of the light combiner element 203. In another embodiment, the scattering structure 211 is, for example, disposed on the reflection region R1 of the phosphor wheel 202.

Figure 10:
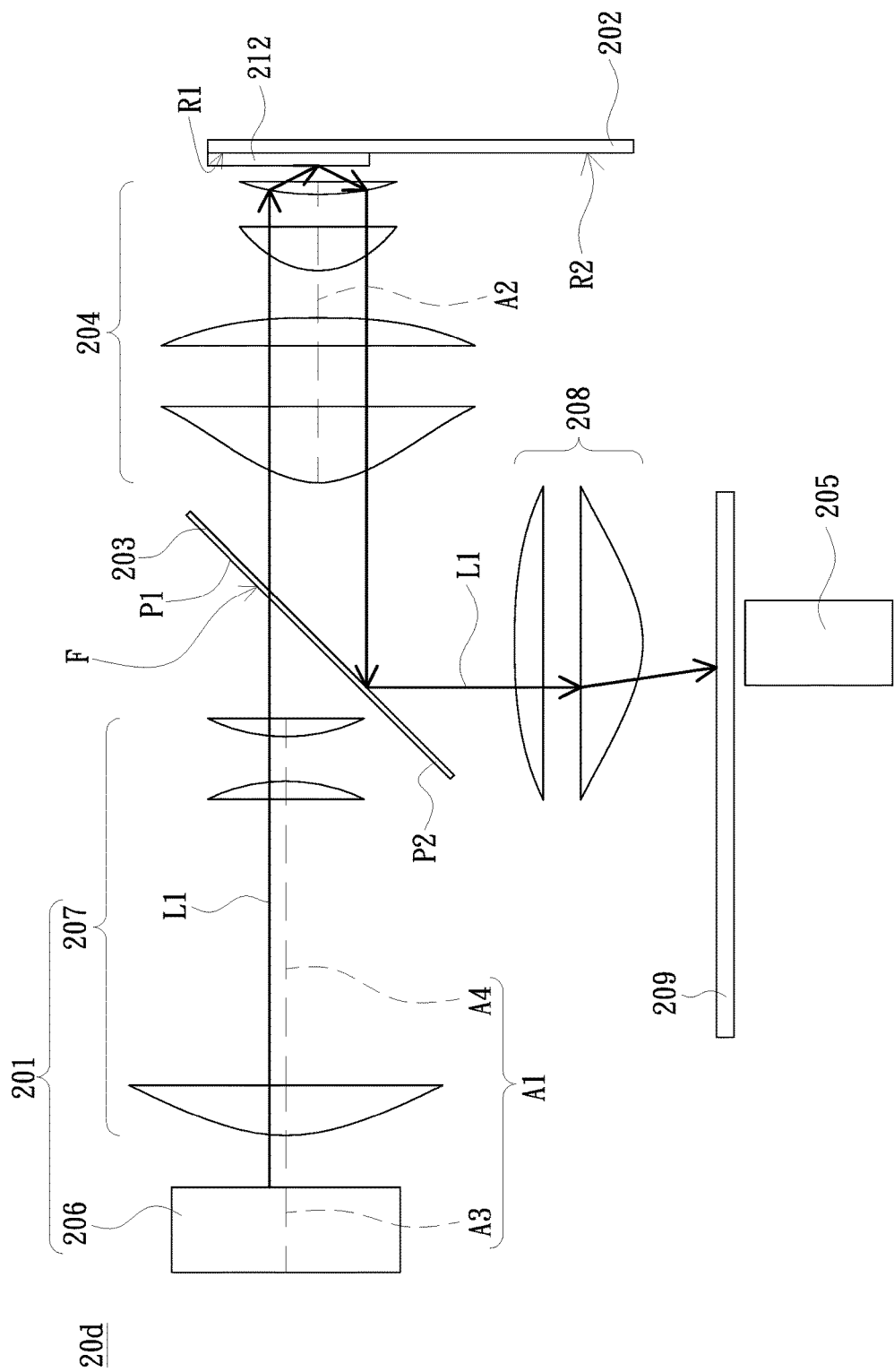
FIG. 10 is a schematic view of an illumination system in accordance with another embodiment of the invention.

FIG. 10 is a schematic view of an illumination system in accordance with another embodiment of the invention. As shown in FIG. 10, the illumination system 20*e* of the embodiment is similar to the illumination system 20 shown in FIG. 3, except that the illumination system 20*e* of the embodiment further includes a green phosphor layer 212. The green phosphor layer 212 of the embodiment may be disposed in the reflection region R1 of the phosphor wheel 202. The effect of the green phosphor layer 212 is to improve the color quality of the first beam L1 and to allow the blue beam of the first beam L1 reflected from the reflection region R1 of the phosphor wheel 202 presents a greenish color, thereby adjusting the problem of the blue beam in the existing image having a purplish color. The greenish blue beam allows the blue color in the image projected by the lens to be closer to the blue in definition (e.g., Rec. 709, etc.), effectively suppresses the degree of speckle of the first beam L1, reduces the speckle noise of the illumination system 20*e*, thereby increasing the image quality of the projector.

Figure 11:
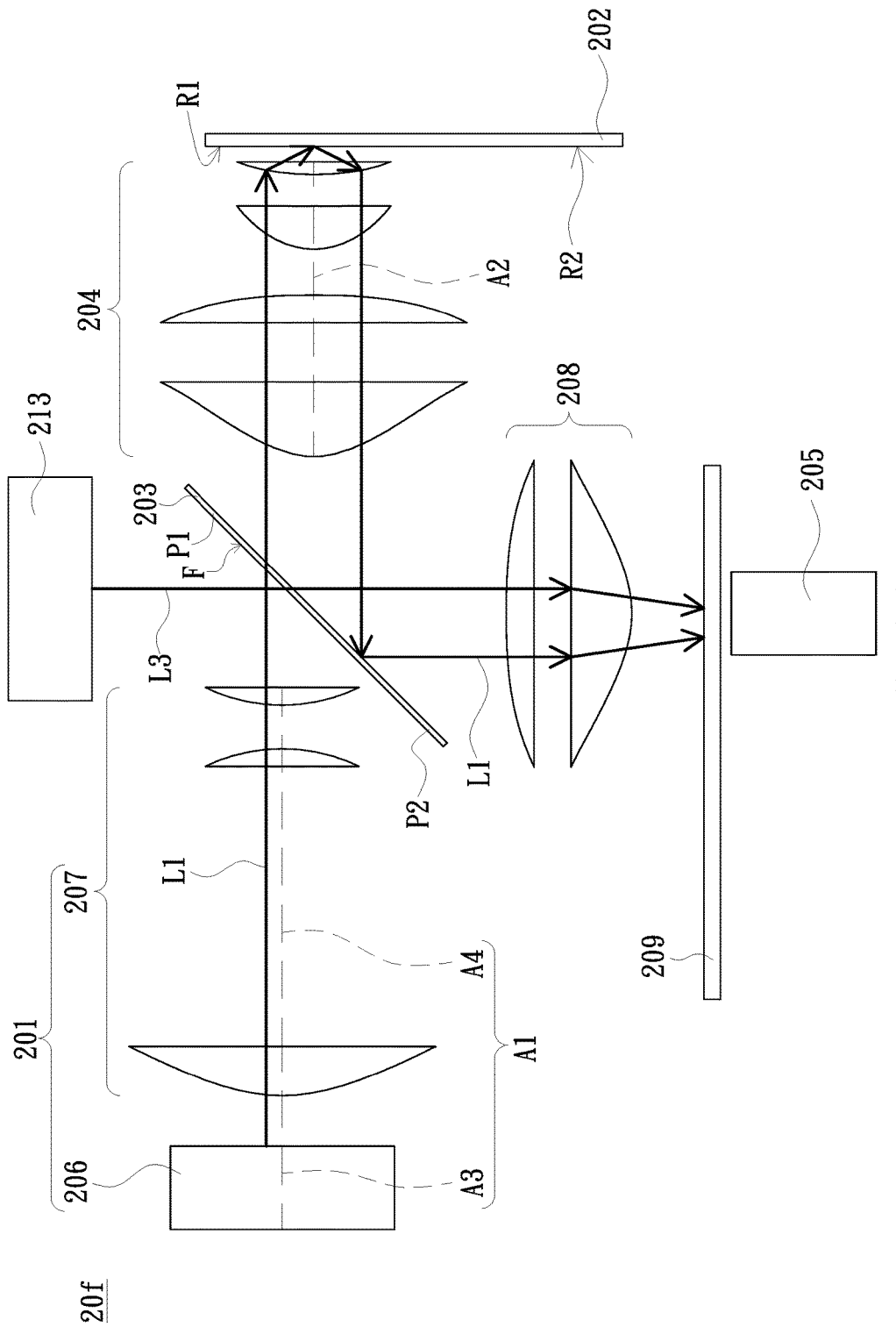
FIG. 11 is a schematic view of an illumination system in accordance with another embodiment of the invention.

FIG. 11 is a schematic view of an illumination system in accordance with another embodiment of the invention. As shown in FIG. 11, the illumination system 20*f* of the embodiment is similar to the illumination system 20 shown in FIG. 3, except that the illumination system 20*f* of the embodiment further includes an auxiliary excitation light source 213. The auxiliary excitation light source 213 of the embodiment is disposed on one side of the excitation light source group 201, and the auxiliary excitation light source 213 is adapted to provide a third beam L3. In the embodiment, the third beam L3 provided by the auxiliary excitation light source 213 passes through the dichroic portion P1 of the light combiner element 203 and the third lens group 208 and is transmitted to the color wheel 209. The effect of the auxiliary excitation light source 213 is to improve the color quality of the first beam L1 or the second beam L2, thereby improving the image quality of the projector. In the embodiment, the third beam L3 provided by the auxiliary excitation light source 213 is, for example, a red beam or a blue beam, but the invention is not limited thereto.

In summary, in the illumination system according to the embodiments of the invention, for example, no matter the first optical axis A1, the second optical axis A2, the third optical axis A3 and the fourth optical axis A4 are parallel to each, the light utilization efficiency is effectively increased by inclining one of the lenses in the second lens group 207 by a range of ±5 degrees with respect to the fourth optical axis A4, wherein the fourth optical axis A4 is defined as a virtual line connected by the central points of a plurality of lenses in the second lens group 207.

In summary, according to the illumination system of the embodiment of the invention, since a light combiner element having a dichroic portion and a reflection portion is disposed between an excitation light source group and a phosphor wheel, the optical path is effectively shortened, the number of optical components of the illumination system is drastically reduced, thereby reducing the cost and volume. In addition, the projector of the embodiment of the invention has some advantages such as having lower cost and smaller size due to employing the illumination system.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. An illumination system, comprising:
   an excitation light source group, adapted to provide a first beam, wherein the excitation light source group has a first optical axis;
   a phosphor wheel, having a reflection region and a wavelength conversion region;
   a light combiner element, disposed between the excitation light source group and the phosphor wheel, wherein the light combiner element has a dichroic portion and a reflection portion; and
   a first lens group, disposed between the light combiner element and the phosphor wheel, wherein the first lens group has a second optical axis, the first beam passes through the dichroic portion and the first lens group and is transmitted to the reflection region of the phosphor wheel, wherein the first beam passes through the first lens group via a first side of the second optical axis, the reflection region of the phosphor wheel reflects the first beam, the reflected first beam passes through the first lens group and is transmitted to the light combiner element, wherein the first beam reflected from the reflection region passes through the first lens group via a second side of the second optical axis and is transmitted to the reflection portion of the light combiner element, wherein the first optical axis of the excitation light source group and the second optical axis of the first lens group are not coaxial with each other;
   wherein the light combiner element has a surface facing the excitation light source group, an area of the surface is A, an area of the dichroic portion of the light combiner element is A', and ½A<A'≤¾A.

2. The illumination system according to claim 1, wherein the excitation light sources group comprises a light emitting element and a second lens group, the light emitting element has a third optical axis, the second lens group has a fourth optical axis, the third optical axis of the light emitting element and the second optical axis of the first lens group are not coaxial with each other, and the fourth optical axis of the second lens group and the second optical axis of the first lens group are not coaxial with each other.

3. The illumination system according to claim 2, wherein the third optical axis of the light emitting element and the fourth optical axis of the second lens group are coaxial with each other.

4. The illumination system according to claim 2, wherein the third optical axis of the light emitting element and the fourth optical axis of the second lens group are not coaxial with each other.

5. The illumination system according to claim 4, wherein the third optical axis of the light emitting element and the fourth optical axis of the second lens group are parallel to each other.

6. The illumination system according to claim 4, wherein the third optical axis of the light emitting element and the fourth optical axis of the second lens group are not parallel to each other, there is an angle between the third optical axis and the fourth optical axis, and the angle is substantially equal to 5 degrees.

7. The illumination system according to claim 1, further comprising a third lens group and a color wheel, wherein the wavelength conversion region of the phosphor wheel converts a portion of the first beam into a second beam and reflects the second beam, the reflected second beam passes through the first lens group and is transmitted to the dichroic portion and the reflection portion of the light combiner element, and the second beam is reflected by the dichroic portion and the reflection portion of the light combiner element and transmitted to the third lens group, wherein the third lens group and the color wheel are located on transmission paths of the first beam and the second beam, wherein the third lens group is located between the light combiner element and the color wheel.

8. The illumination system according to claim 7, further comprising a beam splitting element, wherein the beam splitting element is located on the transmission paths of the first beam and the second beam and located between the light combiner element and the third beam lens group, wherein the second beam passing through the first lens group passes through the beam splitting element and is transmitted to the light combiner element, the portion of the first beam passing through the first lens group passes through the beam splitting element and is transmitted to the light combiner element, a reminder of the first beam passing through the first lens group is reflected by the beam splitting element and transmitted to the third lens group.

9. The illumination system according to claim 7, further comprising a scattering structure, wherein the scattering structure is disposed on the color wheel.

10. The illumination system according to claim 7, further comprising an auxiliary excitation light source, wherein the auxiliary excitation light source is disposed on one side of the excitation light source group, the auxiliary excitation light source is adapted to provide a third beam, and the third beam passes through the light combiner element and is transmitted to the color wheel.

11. The illumination system according to claim 7, wherein the phosphor wheel and the color wheel are in the same side of the light combiner element.

12. The illumination system according to claim 1, wherein there is no a reflecting mirror disposed between the phosphor wheel and the light combiner element in the transmission path of the first beam.

13. The illumination system according to claim 1, further comprising a scattering structure, wherein the scattering structure is disposed in the dichroic portion of the light combiner element.

14. The illumination system according to claim 1, further comprising a scattering structure, wherein the scattering structure is disposed in the reflection region of the phosphor wheel.

15. The illumination system according to claim 1, further comprising a green phosphor layer, wherein the green phosphor layer is disposed in the reflection region of the phosphor wheel.

16. A projector, comprising:
    an illumination system, comprising:
      an excitation light source group, adapted to provide a first beam, wherein the excitation light source group has a first optical axis;
      a phosphor wheel, having a reflection region and a wavelength conversion region;
      a light combiner element, disposed between the excitation light source group and the phosphor wheel, wherein the light combiner element has a dichroic portion and a reflection portion;
      a first lens group, disposed between the light combiner element and the phosphor wheel, wherein the first lens group has a second optical axis, the first beam passes through the dichroic portion and the first lens group and is transmitted to the reflection region of the phosphor wheel, wherein the first beam passes through the first lens group via a first side of the second optical axis, the reflection region of the phosphor wheel reflects the first beam, the reflected first beam passes through the first lens group and is transmitted to the light combiner element, wherein the first beam reflected from the reflection region passes through the first lens group via a second side of the second optical axis and is transmitted to the reflection portion of the light combiner element, wherein the first optical axis of the excitation light source group and the second optical axis of the first lens group are not coaxial with each other; and a light collection component, located on transmission paths of the first beam and a second beam and adapted to receive the first beam passing through the first lens group and the second beam to form an illumination beam;

a light valve, located on a transmission path of the illumination beam and adapted to convert the illumination beam into an image beam; and a projection lens, located on a transmission path of the image beam and adapted to convert the image beam into a projection beam;

wherein the light combiner element has a surface facing the excitation light source group, an area of the surface is A, an area of the dichroic portion of the light combiner element is A', and $\frac{1}{2}A < A' \leq \frac{3}{4}A$.

* * * * *